US012785811B2

(12) United States Patent
Akiyama

(10) Patent No.: US 12,785,811 B2
(45) Date of Patent: Nov. 3, 2026

(54) OPTICAL TRANSMISSION DEVICE

(71) Applicant: 1FINITY Inc., Kawasaki (JP)

(72) Inventor: Tomoyuki Akiyama, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 321 days.

(21) Appl. No.: 18/743,292

(22) Filed: Jun. 14, 2024

(65) Prior Publication Data

US 2025/0007612 A1 Jan. 2, 2025

(30) Foreign Application Priority Data

Jun. 27, 2023 (JP) ................................. 2023-105062

(51) Int. Cl.

*H04B 10/294* (2013.01)
*H04B 10/50* (2013.01)
*H04J 14/02* (2006.01)

(52) U.S. Cl.

CPC ......... *H04B 10/294* (2013.01); *H04B 10/506* (2013.01); *H04J 14/0221* (2013.01)

(58) Field of Classification Search

CPC ................ H04B 10/294; H04B 10/506; H04B 10/5053; H04J 14/0221
See application file for complete search history.

(56) References Cited

U.S. PATENT DOCUMENTS 6,804,430 B2 * 10/2004 Ooyama ............ G02B 6/29352 385/27
8,923,707 B2 * 12/2014 Goldfarb ............ H04B 10/6165 398/208
9,100,129 B2 * 8/2015 Baney ..................... H04B 10/61
9,716,552 B2 * 7/2017 Doerr ................. H04Q 11/0066
10,491,321 B2 * 11/2019 Akiyama ............. G02B 6/2935
11,095,389 B2 * 8/2021 Elby .................. H04Q 11/0062
11,916,595 B1 * 2/2024 Jalali .................. H04B 10/2543
12,052,052 B2 * 7/2024 Akiyama ......... H04B 10/07955
2003/0043437 A1 * 3/2003 Stough ............... H04B 10/0773 398/141
2005/0276539 A1 * 12/2005 Fukuda .............. G02B 6/29353 385/24

(Continued)

FOREIGN PATENT DOCUMENTS

EP 3613157 B1 * 4/2026 .......... H04J 14/0305
JP 2019-135524 8/2019
JP 2020-194114 12/2020

*Primary Examiner* — Tanya T Motsinger
(74) *Attorney, Agent, or Firm* — Fujitsu Intellectual Property Center

(57) ABSTRACT

An optical transmission device includes an optical circuit in which circuit groups are connected in multiple stages in a tree form, each of the circuit groups including three circuits of a two-input two-output type each having periodic transmission characteristics, the three circuits being connected in multiple stages in a tree form so that one of subsequent ports of a first circuit at a preceding stage of the three circuits is connected to one of preceding ports of a second circuit at a subsequent stage of the remaining two of the three circuits, and the other of the subsequent ports of the first circuit is connected to one of preceding ports of a third circuit at a subsequent stage of the remaining two, a modulator that is connected to one of subsequent ports of the second circuit, and a 90-degree circuit that is connected to the other of the subsequent ports.

5 Claims, 3 Drawing Sheets

(56) References Cited

U.S. PATENT DOCUMENTS

| | | | | |
|---|---|---|---|---|
| 2009/0041243 | A1* | 2/2009 | Nambu | H04L 9/0858 380/256 |
| 2013/0177027 | A1* | 7/2013 | Rasras | H04J 14/002 370/464 |
| 2019/0081725 | A1* | 3/2019 | Rahn | H04B 10/07955 |
| 2019/0097732 | A1* | 3/2019 | Akiyama | G02B 6/29395 |
| 2019/0245642 | A1* | 8/2019 | Akiyama | G02B 6/12007 |
| 2020/0252154 | A1* | 8/2020 | Wu | H04B 10/25 |
| 2020/0379181 | A1* | 12/2020 | Akiyama | H04J 14/0282 |
| 2022/0416886 | A1* | 12/2022 | Akiyama | H04B 10/07955 |
| 2024/0089001 | A1* | 3/2024 | Schow | G02F 3/00 |
| 2024/0094470 | A1* | 3/2024 | Matsui | H04B 10/572 |

* cited by examiner

OPTICAL TRANSMISSION DEVICE

CROSS-REFERENCE TO RELATED APPLICATION

This application is based upon and claims the benefit of priority of the prior Japanese Patent Application No. 2023-105062, filed on Jun. 27, 2023, the entire contents of which are incorporated herein by reference.

FIELD

A certain aspect of embodiments described herein relates to an optical transmission device.

BACKGROUND

Optical demultiplexers used in wavelength division multiplexing optical transmission devices are known as disclosed in, for example, Japanese Patent Application Laid-Open No. 2020-194114. Various types of optical demultiplexers are known. For example, an optical demultiplexer in which asymmetric Mach-Zehnder interferometers (AMZ) having a pair of arms with different lengths are connected in multiple stages in a tree form (hereinafter, referred to as an AMZ-type optical demultiplexer) is known as disclosed in, for example, Japanese Patent Application Laid-Open No. 2019-135524.

SUMMARY

Signal light beams with respective wavelengths demultiplexed by the AMZ-type optical demultiplexer described above are output from respective AMZs at the last stage, and the output end is randomly determined by the initial optical phase in the pair of arms of each AMZ. That is, it is impossible to uniquely determine which wavelength signal light beam is output from which output end of the AMZ-type optical demultiplexers. This causes a problem that each signal light beam cannot be output from a desired output end. This problem is not limited to the AMZ-type optical demultiplexer described above, and is also present in other optical demultiplexers using an AMZ in which the output end for the signal light beam is randomly determined.

Therefore, it is desirable to provide an optical transmission device that uniquely determines the relationship between the output end and the wavelength of the signal light beam.

According to an aspect of the embodiments, there is provided an optical transmission device including: an optical circuit in which optical unit circuit groups are connected in multiple stages in a tree form, each of the optical unit circuit groups including three optical unit circuits of a two-input two-output type each having periodic transmission characteristics, the three optical unit circuits being connected in multiple stages in a tree form so that a first subsequent-stage port of two subsequent-stage ports of a first optical unit circuit, which is arranged at a preceding-stage as one of the three optical unit circuits, is connected to a first preceding-stage port of two preceding-stage ports of a second optical unit circuit, which is arranged at a subsequent-stage as one of the remaining two of the three optical unit circuits, and a second subsequent-stage port of the two subsequent-stage ports of the first optical unit circuit is connected to a first preceding-stage port of two preceding-stage ports of a third optical unit circuit, which is arranged at a subsequent-stage as the other of the remaining two of the three optical unit circuit; a first light source that outputs a first local oscillator light beam; a second light source that outputs a second local oscillator light beam having a frequency that is half a period away from a period of the second optical unit circuit; an optical modulator including: a predetermined output port that is connected to a first subsequent-stage port of two subsequent-stage ports provided in the second optical unit circuit at a last stage included in a first optical unit circuit group, which is arranged at a last stage of the optical circuit among the three optical unit circuit groups, and a predetermined input port that is connected to the first light source; a 90-degree hybrid circuit including: a first input port connected to a second subsequent-stage port of the two subsequent-stage ports provided in the second optical unit circuit at the last stage, and a second input port connected to the second light source, wherein the optical circuit demultiplexes a first wavelength-multiplexed signal light beam input to a first preceding-stage port of two preceding-stage ports provided in the first optical unit circuit included in a second optical unit circuit group, which is arranged at a first stage of the optical circuit among the three optical unit circuit groups, into first signal light beams with respective first wavelengths different from each other and outputs the first signal light beams from a second subsequent-stage port of the two subsequent-stage ports provided in the second optical unit circuit at the last stage, and multiplexes second signal light beams with respective second wavelengths, which are not adjacent to the first wavelengths, input to a first subsequent-stage port of the two subsequent-stage ports provided in the second optical unit circuit at the last stage, and outputs a second wavelength-multiplexed signal light beam from a second preceding-stage port of the two preceding-stage ports provided in the first optical unit circuit at the first stage.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, an embodiment for carrying out the present disclosure will be described with reference to the drawings. First, a comparative example will be described with reference to FIG. 1A and FIG. 1B, and then an embodiment will be described with reference to FIG. 2.

COMPARATIVE EXAMPLE

Figure 1A:
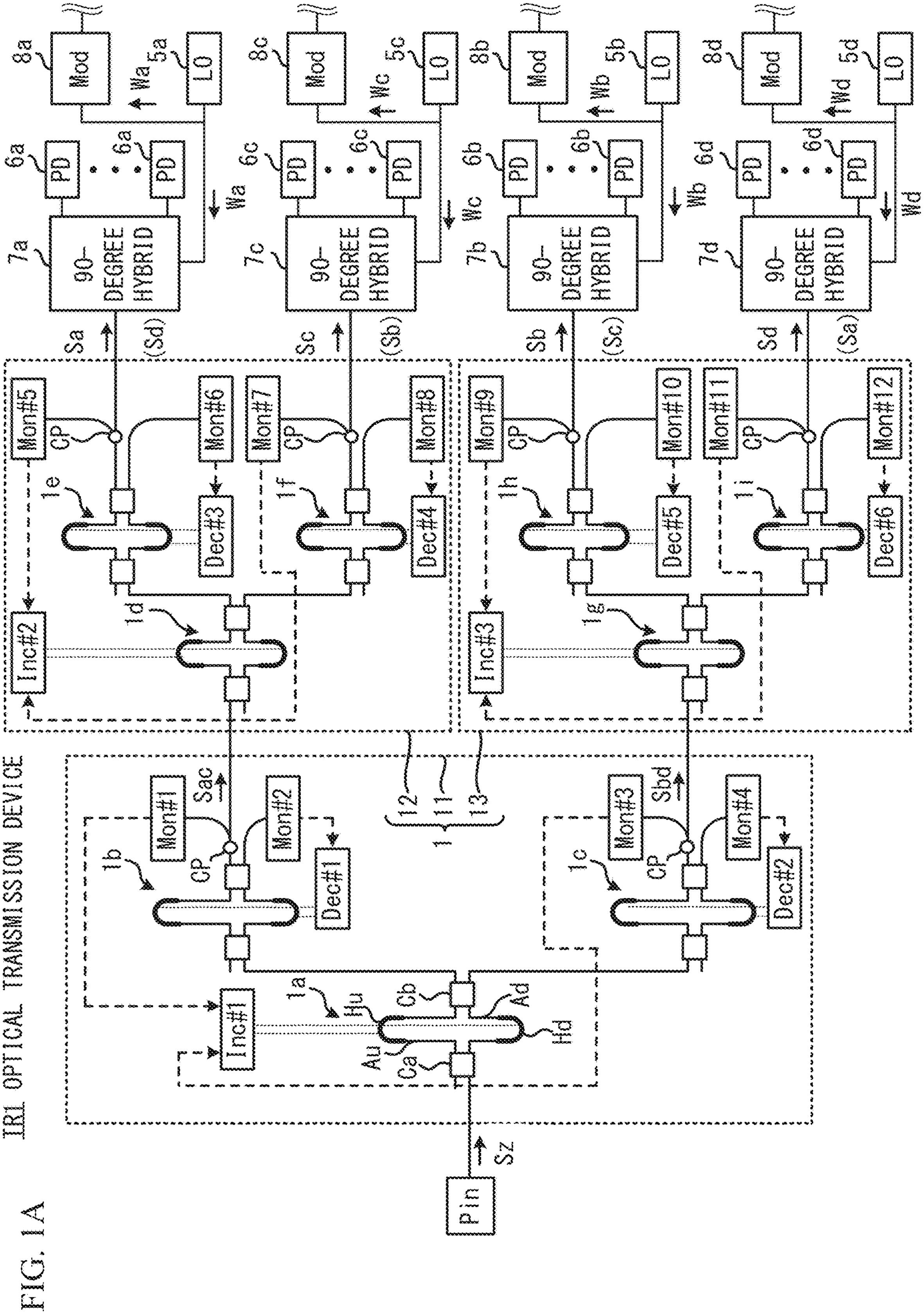
FIG. 1A illustrates a part of an optical transmission device in accordance with a comparative example.
Figure 1B:
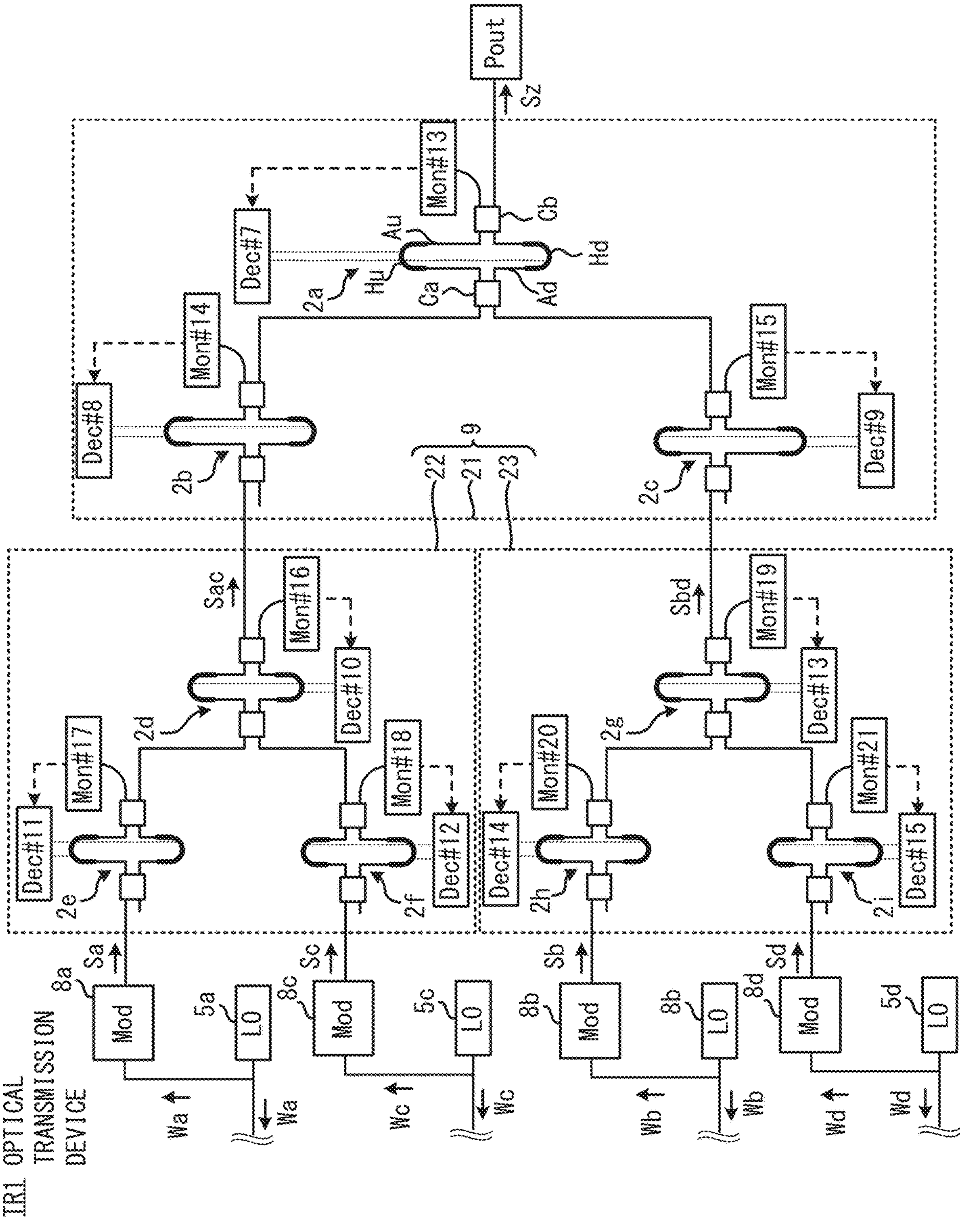
FIG. 1B illustrates the remaining part of the optical transmission device in accordance with the comparative example.

As illustrated in FIG. 1A, an optical transmission device TR1 in accordance with the comparative example includes an optical demultiplexer 1, photodiodes (PDs) 6*a* to 6*d*, and 90-degree hybrid circuits 7*a* to 7*d*. As illustrated in FIG. 1B, the optical transmission device TR1 of the comparative example also includes local oscillators (LOs) 5*a* to 5*d*, optical modulators (denoted by Mod in FIG. 1B) 8*a* to 8*d*, and an optical multiplexer 9. The optical transmission device TR1 includes four PDs 6*a*, but some of the four PDs 6*a* are not illustrated in the drawing. The same applies to the PDs 6*b* to PDs 6*d* as well as the PDs 6*a*.

The LO 5*a* is connected to both the 90-degree hybrid circuit 7*a* and the optical modulator 8*a*. The LO 5*b* is connected to both the 90-degree hybrid circuit 7*b* and the optical modulator 8*b*. The LO 5*c* is connected to both the 90-degree hybrid circuit 7*c* and the optical modulator 8*c*. The LO 5*d* is connected to both the 90-degree hybrid circuit 7*d* and the optical modulator 8*d*.

First, the optical demultiplexer 1 will be described in detail with reference to FIG. 1A.

The optical demultiplexer 1 includes a preceding-stage demultiplexing circuit 11 and subsequent-stage demultiplexing circuits 12 and 13 optically connected to stages following the preceding-stage demultiplexing circuit 11, respectively. The optical demultiplexer 1 demultiplexes a wavelength multiplexed signal light beam Sz of four wavelengths λa to λd into signal light beams Sa, Sb, Sc, and Sd with respective center wavelengths λa to λd of regular wavelength spacing, for example. The optical demultiplexer 1 performs demultiplexing processing using each of the preceding-stage demultiplexing circuit 11 and the subsequent-stage demultiplexing circuits 12 and 13 as a unit.

The optical demultiplexer 1 includes AMZs 1*a* to 1*i* connected in multiple stages in a tree form (to be specific, a forward tree form). The preceding-stage demultiplexing circuit 11 includes the AMZs 1*a* to 1*c*, the subsequent-stage demultiplexing circuit 12 includes the AMZs 1*d* to 1*f*, and the subsequent-stage demultiplexing circuit 13 includes the AMZs 1*g* to 1*i*. That is, the optical demultiplexer 1 corresponds to an AMZ-type optical demultiplexer. The AMZs 1*a* to 1*i* each have a pair of arms Au, Ad with different lengths (waveguide lengths), an input coupler Ca, and an output coupler Cb. Each of the input coupler Ca and the output coupler Cb is a 2×2 coupler having two input ports and two output ports.

The two output ports of the input coupler Ca are optically connected to the input ends of the pair of arms Au and Ad, respectively. The two input ports of the output coupler Cb are optically connected to the output ends of the pair of arms Au and Ad, respectively. The wavelength-multiplexed signal light beam Sz input to the input coupler Ca is input to the pair of arms Au and Ad.

The upper arm Au is provided with a phase shifter Hu, and the lower arm Ad is provided with a phase shifter Hd. The phase shifters Hu and Hd adjust the optical phases in the pair of arms Au and Ad of each of the AMZs 1*a* to 1*i*, respectively. This compensates for the shift of the optical phase due to manufacturing variations, and reduces the crosstalk. The phase shifters Hu and Hd are heaters formed of a metal (resistive) thin film such as tungsten, titanium, or platinum, and change the temperatures of the waveguides in the arms Au and Ad, respectively. This changes the refractive indexes in the arms Au and Ad, and thus the optical phases in the arms Au and Ad are adjusted. The phase shifters Hu and Hd are not limited to this configuration, and may be means for electrically changing the respective carrier densities in the waveguides of the arms Au and Ad by the carrier plasma effect.

The optical demultiplexer 1 includes monitor circuits Mon #1 to Mon #12 that monitor the power of the output light beams of the AMZs 1*a* to 1*i*, control circuits Dec #1 to Dec #6 that perform control to decrease the power according to the monitoring results of the power of the output light beams, and control circuits Inc #1 to Inc #3 that perform control to increase the power according to the monitoring results of the power of the output light beams, in order to control the phase shifters Hu and Hd of the AMZs 1*a* to 1*i*. The monitor circuits Mon #1 to Mon #12 are implemented by, for example, PDs. The control circuits Dec #1 to Dec #3 and Inc #1 to Inc #3 are implemented by hardware circuits such as field programmable gate arrays (FPGAs) or application specified integrated circuits (ASICs).

The monitor circuits Mon #1 to Mon #12 monitor the power of the output light beams of the AMZs 1*b*, 1*c*, 1*e*, 1*f*, 1*h*, and 1*i*. The control circuits Dec #1 to Dec #6 and Inc #1 to Inc #3 control the adjustment amounts of the optical phases in the pair of arms Au and Ad with respect to the phase shifters Hu and Hd according to the power of the output light beams, thereby compensate for the shifts of the optical phases. For example, the control circuits Dec #1 to Dec #6 control the heater power supplied to the phase shifters Hu and Hd so as to lower the temperatures of the phase shifters Hu and Hd. The control circuits Inc #1 to Inc #3 control the heater power supplied to the phase shifters Hu and Hd so as to increase the temperatures of the phase shifters Hu and Hd.

The preceding-stage demultiplexing circuit 11 includes the AMZs 1*a* to 1*c*, the control circuits Inc #1, Dec #1, and Dec #2, and the monitor circuits Mon #1 to Mon #4. The AMZs 1*b* and 1*c* are optically connected to stages following the AMZ 1*a*, respectively. The AMZs 1*d* and 1*g* are optically connected to the stages following the AMZs 1*b* and 1*c*, respectively. An input port Pin from which the wavelength-multiplexed signal light beam Sz is input is provided at the input end of the AMZ 1*a*.

The monitor circuit Mon #1 is optically connected to a first output port of the output coupler Cb of the AMZ 1*b* through a branching coupler CP, and the monitor circuit Mon #3 is optically connected to a first output port of the output coupler Cb of the AMZ 1*c* through the branching coupler CP. The monitor circuit Mon #1 monitors the power of the output light beam output from the AMZ 1*b* to the AMZ 1*d*. The monitor circuit Mon #1 notifies the control circuit Inc #1 of the power of the monitoring result. The monitor circuit Mon #3 monitors the power of the output light beam output from the AMZ 1*c* to the AMZ 1*g*. The monitor circuit Mon #3 notifies the control circuit Inc #1 of the power of the monitoring result.

The monitor circuit Mon #2 is optically connected to a second output port of the output coupler Cb of the AMZ 1*b*, and the monitor circuit Mon #4 is optically connected to a second output port of the output coupler Cb of the AMZ 1*c*. The monitor circuits Mon #2 and Mon #4 monitor the power of the output light beams output from the second output ports of the output couplers Cb, respectively. The monitor circuit Mon #2 notifies the control circuit Dec #1 of the power of the monitoring result. The monitor circuit Mon #4 notifies the control circuit Dec #2 of the power of the monitoring result.

The control circuit Inc #1 controls the adjustment amounts of the optical phases for the phase shifters Hu and Hd of the AMZ 1*a* in accordance with the monitoring results of the output light beams by the monitor circuits Mon #1 and Mon #3. The control circuit Dec #1 controls the adjustment amounts of the optical phases for the phase shifters Hu and Hd of the AMZ 1*b* in accordance with the monitoring result of the output light beam by the monitor circuit Mon #2. The control circuit Dec #2 controls the adjustment amounts of the optical phases for the phase shifters Hu and Hd of the AMZ 1*c* in accordance with the monitoring result of the output light beam by the monitor circuit Mon #4.

With the above configuration, the power of the output light beams output from the first output ports of the output couplers Cb of the AMZs 1*b* and 1*c* to the AMZs 1*d* and 1*g* at the subsequent stages increases, and the power of the output light beams output from the second output ports of the output couplers Cb of the AMZs 1*b* and 1*c* to the monitor circuits Mon #2 and Mon #4 decrease.

The subsequent-stage demultiplexing circuit 12 includes the AMZs 1*d* to 1*f*, the control circuits Inc #2, Dec #3, and Dec #4, and the monitor circuits Mon #5 to Mon #8. The AMZs 1*e* and 1*f* are optically connected to stages following the AMZ 1*d*, respectively. First output ports of the output couplers Cb of the AMZs 1*e* and 1*f* are connected to the 90-degree hybrid circuits 7*a* and 7*c*, respectively, to which the branched light beam is output.

The 90-degree hybrid circuit 7*a* uses a wavelength light beam Wa with a center frequency λa output from the LO 5*a* as a local oscillator light beam, and causes the signal light beam Sa and the local oscillator light beam to interfere with each other, thereby detecting an I-channel (inphase component) and a Q-channel (quadrature component) in the X-polarized components. That is, the 90-degree hybrid circuit 7*a* performs coherent detection in which the signal light beam Sa and the local oscillator light beam are caused to interfere with each other to detect an interfering signal, and the amplitude and phase of the signal light beam Sa are detected. The 90-degree hybrid circuit 7*a* outputs the photoelectric field component corresponding to the amplitude and phase of the signal light beam Sa to the PDs 6*a* at the subsequent stage. The PD 6*a* converts the photoelectric field component into an electrical analog signal. The 90-degree hybrid circuit 7*c* and the PD 6*c* are basically the same as the 90-degree hybrid circuit 7*a* and the PD 6*a*, respectively, and thus detailed description thereof will be omitted.

The monitor circuit Mon #5 is optically connected to a first output port of the output coupler Cb of the AMZ 1*e* through the branching coupler CP, and the monitor circuit Mon #7 is optically connected to a first output port of the output coupler Cb of the AMZ 1*f* through the branching coupler CP. The monitor circuit Mon #5 monitors the power of the output light beam output from the AMZ 1*e* to the 90-degree hybrid circuit 7*a*. The monitor circuit Mon #5 notifies the control circuit Inc #2 of the power of the monitoring result. The monitor circuit Mon #7 monitors the power of the output light beam output from the AMZ 1*f* to the 90-degree hybrid circuit 7*c*. The monitor circuit Mon #7 notifies the control circuit Inc #2 of the power of the monitoring result.

The monitor circuit Mon #6 is optically connected to a second output port of the output coupler Cb of the AMZ 1*e*, and the monitor circuit Mon #8 is optically connected to a second output port of the output coupler Cb of the AMZ1*f*. The monitor circuit Mon #6 monitors the power of the output light beam output from a second output port of the output coupler Cb of the AMZ 1*e*, and the monitor circuit Mon #8 monitors the power of the output light beam output from a second output port of the output coupler Cb of the AMZ 1*f*. The monitor circuit Mon #6 notifies the control circuit Dec #3 of the power of the monitoring result. The monitor circuit Mon #8 notifies the control circuit Dec #4 of the power of the monitoring result.

The control circuit Inc #2 controls the adjustment amounts of the optical phases for the phase shifters Hu and Hd of the AMZ 1*d* in accordance with the respective monitoring results of the output light beams by the monitor circuits Mon #5 and Mon #7. The control circuit Dec #3 controls the adjustment amounts of the optical phases for the phase shifters Hu and Hd of the AMZ 1*e* in accordance with the monitoring result of the output light beam by the monitor circuit Mon #6. The control circuit Dec #4 controls the adjustment amounts of the optical phases for the phase shifters Hu and Hd in the AMZ 1*f* in accordance with the monitoring result of the output light beam by the monitor circuit Mon #8.

With the above configuration, the power of the output light beam output from the first output port of the output coupler Cb of the AMZ 1*e* to the 90-degree hybrid circuit 7*a* and the power of the output light beam output from the first output port of the output coupler Cb of the AMZ 1*f* to the 90-degree hybrid circuit 7*c* increase, and the power of the output light beam output from the second output port of the output coupler Cb of the AMZ 1*e* to the monitor circuit Mon #6 and the power of the output light beam output from the second output port of the output coupler Cb of the AMZ 1*f* to the monitor circuit Mon #8 decrease.

The subsequent-stage demultiplexing circuit 13 includes the AMZs 1*g* to 1*i*, the control circuits Inc #3, Dec #5, and Dec #6, and the monitor circuits Mon #9 to Mon #12. The AMZs 1*h* and the 1*i* are optically connected to stages following the AMZ 1*g*, respectively. The 90-degree hybrid circuit 7*b*, to which the branched light beam is output, is connected to a first output port of the output coupler Cb of the AMZ 1*h*, and the 90-degree hybrid circuit 7*d*, to which the branched light beam is output, is connected to a first output port of the output coupler Cb of the AMZ 1*i*.

The 90-degree hybrid circuit 7*b* uses a wavelength light beam Wb with a center frequency λb output from the LO 5*b* as a local oscillator light beam with a center frequency λb, and causes the signal light beam Sb and the local oscillator light beam to interfere with each other, thereby detecting an I-channel (inphase components) and a Q-channel (quadrature components) in the X-polarized components. That is, the 90-degree hybrid circuit 7*b* performs coherent detection in which the signal light beam Sb and the local oscillator light beam are caused to interfere with each other to detect an interfering signal, and the amplitude and phase of the signal light beam Sb are detected. The 90-degree hybrid circuit 7*b* outputs the photoelectric field component corresponding to the amplitude and phase of the signal light beam Sb to the PDs 6*b* at the subsequent stage. The PD 6*b* converts the photoelectric field component into an electrical analog signal. The 90-degree hybrid circuit 7*d* and the PD 6*d* are basically the same as the 90-degree hybrid circuit 7*b* and the PD 6*b*, respectively, and thus detailed description thereof will be omitted.

The monitor circuit Mon #9 is optically connected to a first output port of the output coupler Cb of the AMZ 1*h* through the branching coupler CP, and the monitor circuit Mon #11 is optically connected to a first output port of the output coupler Cb of the AMZ 1*i* through the branching coupler CP. The monitor circuit Mon #9 monitors the power of the output light beam output from the AMZ 1*h* to the 90-degree hybrid circuit 7*b*. The monitor circuit Mon #9 notifies the control circuit Inc #3 of the power of the monitoring result. The monitor circuit Mon #12 monitors the power of the output light beam output from the AMZ 1*i* to the 90-degree hybrid circuit 7*d*. The monitor circuit Mon #11 notifies the control circuit Inc #3 of the power of the monitoring result.

The monitor circuit Mon #10 is optically connected to a second output port of the output coupler Cb of the AMZ 1*h*, and the monitor circuit Mon #12 is optically connected to a second output port of the output coupler Cb of the AMZ 1*i*. The monitor circuit Mon #10 monitors the power of the output light beam output from a second output port of the output coupler Cb, and the monitor circuit Mon #12 monitors the power of the output light beam output from a second output port of the output coupler Cb. The monitor circuit Mon #10 notifies the control circuit Dec #5 of the power of the monitoring result. The monitor circuit Mon #12 notifies the control circuit Dec #6 of the power of the monitoring result.

The control circuit Inc #3 controls the adjustment amounts of the optical phases for the phase shifters Hu and Hd in the AMZ 1*g* in accordance with the respective monitoring results of the output light beams by the monitor circuits Mon #9 and Mon #11. The control circuit Dec #5 controls the adjustment amounts of the optical phases for the phase shifters Hu and Hd of the AMZ 1*h* in accordance with the monitoring result of the output light beam by the monitor circuit Mon #10. The control circuit Dec #6 controls the adjustment amounts of the optical phases for the phase shifters Hu and Hd in the AMZ 1*i* in accordance with the monitoring result of the output light beam by the monitor circuit Mon #12.

With the above configuration, the power of the output light beam output from the first output port of the output coupler Cb of the AMZ 1*h* to the 90-degree hybrid circuit 7*b* and the power of the output light beam output from the first output port of the output coupler Cb of the AMZ 1*i* to the 90-degree hybrid circuit 7*d* increase, and the power of the output light beam output from the second output port of the output coupler Cb of the AMZ 1*h* to the monitor circuit Mon #10 and the power of the output light beam output from the second output port of the output coupler Cb of the AMZ 1*i* to the monitor circuit Mon #12 decrease.

As described above, the preceding-stage demultiplexing circuit 11 and the subsequent-stage demultiplexing circuits 12 and 13 are connected in multiple stages in a tree form so that the wavelength-multiplexed signal light beam Sz of center wavelengths λa to λd are input from the AMZ 1*a* to each of the AMZs 1*b* and 1*c*, and are input from the AMZs 1*b* and 1*c* to the separate AMZs 1*d* and 1*g* at the subsequent stages, respectively. The wavelength intervals of the transmission bands of the AMZs 1*a* to 1*i* are determined according to their arm length differences. More specifically, the wavelength intervals of the transmission bands of the AMZ 1*a* to 1*i* are substantially inversely proportional to their arm length differences.

The arm length difference of each of the AMZ 1*a* to 1*c* is set so that the wavelength interval of the transmission band is equal to the wavelength spacing 42 of the center wavelengths λa to λd. The arm length differences of the AMZs 1*d* to 1*f* and the AMZ 1g to 1*i* are set to ½ times the arm length differences of the AMZ 1*a* to 1*c* so that the wavelength interval of the transmission band is two times (2×Δλ) the spacing Δλ of the center wavelengths.

Thus, the preceding-stage demultiplexing circuit 11 demultiplexes the wavelength-multiplexed signal light beam Sz into the wavelength-multiplexed signal light beam Sac of center wavelengths λa and λc and the wavelength-multiplexed signal light beam Sbd of center wavelengths λb and λd. The subsequent-stage demultiplexing circuit 12 demultiplexes the wavelength-multiplexed signal light beam Sac into the signal light beam Sa with a center wavelengths λa and the signal light beam Sc with a center wavelength λc. The subsequent-stage demultiplexing circuit 13 demultiplexes the wavelength-multiplexed signal light beam Sbd into the signal light beam Sb with a center wavelength λb and the signal light beam Sd with a center wavelength λd.

In this case, the output destinations of the signal light beams Sa to Sd with respective center wavelengths λa to λd are randomly determined by the initial optical phases in the pair of arms Au and Ad of each of the AMZ 1*a* to 1*i*. Therefore, the signal light beam Sa with a center wavelength λa may be output from the AMZ 1*e*, or the signal light beam Sd with a center wavelength λd may be output from the AMZ 1*e* as indicated in the parentheses. Similarly, the signal light beam Sc with a center wavelength λc may be output from the AMZ 1*f*, or the signal light beam Sb with a center wavelength λb may be output from the AMZ 1*f*. The signal light beam Sb may be output from the AMZ 1*h*, or the signal light beam Sc may be output from the AMZ 1*h*. The signal light beam Sd may be output from the AMZ 1*i*, or the signal light beam Sa may be output from the AMZ 1*i*. As described above, combinations of the signal light beams Sa, Sb, Sc, and Sd with respective center wavelengths λa to λd and the output ends of the AMZs 1*e*, 1*f*, 1*h*, and 1*i* are not always the same.

As described above, the optical transmission device TS1 according to the comparative example has a problem that the signal light beams Sa, Sb, Sc, and Sd cannot be output to a desired output destination, and it is difficult to perform appropriate signal processing for each of the signal light beams Sa, Sb, Sc, and Sd.

Next, the optical multiplexer 9 will be described in detail with reference to FIG. 1B.

The optical multiplexer 9 includes preceding-stage multiplexing circuits 22 and 23 and a subsequent-stage multiplexing circuit 21 optically connected to a stage following the preceding-stage multiplexing circuits 22 and 23. The optical multiplexer 9 multiplexes the signal light beams Sa, Sb, Sc, and Sd with respective center wavelengths λa to λd of regular wavelength spacing into the wavelength-multiplexed signal light beam Sz of four wavelengths λa to λd, for example. The optical multiplexer 9 performs multiplexing processing using each of the preceding-stage multiplexing circuits 22 and 23 and the subsequent-stage multiplexing circuit 21 as a unit.

The optical multiplexer 9 includes AMZs 2*a* to 2*i* connected in multiple stages in a tree form (in particular, an inverted tree form). The preceding-stage multiplexing circuit 22 includes the AMZs 2*d* to 2*f*, the preceding-stage multiplexing circuit 23 includes the AMZs 2*g* to 2*i*, and the subsequent-stage multiplexing circuit 21 includes the AMZs 2*a* to 2*c*. That is, the optical multiplexer 9 may be referred to as an AMZ-type optical multiplexer. Each of the AMZs 2*a* to 2*i* includes a pair of arms Au and Ad with different lengths (waveguide lengths), an input coupler Ca, and an output coupler Cb. Each of the input coupler Ca and the output coupler Cb is a 2×2 coupler having two input ports and two output ports.

The two output ports of the input coupler Ca are optically connected to the input ends of the pair of arms Au and Ad, respectively. The two input ports of the output coupler Cb are optically connected to the output ends of the pair of arms Au and Ad, respectively. The wavelength-multiplexed signal light beam Sz output from the output coupler Cb is input to the output port Pout.

The upper arm Au is provided with a phase shifter Hu, and the lower arm Ad is provided with a phase shifter Hd. The phase shifters Hu and Hd adjust the optical phases in the pair of arms Au and Ad of the AMZs 2*a* to 2*i*, respectively. This compensates for optical phase shift due to manufacturing variations and reduces crosstalk.

The optical multiplexer 9 includes monitor circuits Mon #13 to Mon #21 that monitor the power of the output light beams of the AMZs 2*a* to 2*i* and control circuits Dec #7 to Dec #15 that perform control to decrease the power in accordance with the monitoring results of the power of the output light beams in order to control the phase shifters Hu and Hd of the AMZs 2*a* to 2*i*, respectively. The monitor circuits Mon #13 to Mon #21 are implemented by, for example, PDs. The control circuits Dec #7 to Dec #15 are implemented by hardware circuits such as FPGAs or ASICs.

The monitor circuits Mon #13 to Mon #21 monitor the power of the output light beams of the AMZ 2*a* to 2*i*, respectively. The control circuits Dec #7 to Dec #15 compensate for the optical phase shifts by controlling the adjustment amounts of the optical phases in the pair of arms Au and Ad with respect to the phase shifters Hu and Hd according to the power of the output light beams. For example, the control circuits Dec #7 to Dec #15 control the heater power supplied to the phase shifters Hu and Hd so as to decrease the temperatures of the phase shifters Hu and Hd.

The preceding-stage multiplexing circuit 22 includes the AMZs 2*d* to 2*f*, the control circuits Dec #10 to Dec #12, and the monitor circuits Mon #16 to Mon #18. The AMZ 2*d* is optically connected to the stage following the AMZs 2*e* and 2*f*. The AMZ 2*b* is optically connected to the stage following the AMZ 2*d*. The input end of the AMZ 2*e* is connected to the optical modulator 8*a* from which the signal light beam Sa is output. The input end of the AMZ 2*f* is connected to the optical modulator 8*c* from which the signal light beam Sc is output.

The optical modulator 8*a* uses the wavelength light beam Wa with a center wavelength λa output from the LO 5*a* as a transmission light beam with a center wavelength λa and optically modulates the transmission light beam based on the signal-processed electrical signal. The optically modulated transmission light beam with a center wavelength λa is input to the AMZ 2*e* of the optical multiplexer 9 as the signal light beam Sa. The optical modulator 8*c* uses the wavelength light beam Wc with a center wavelength λc output from the LO 5*c* as a transmission light beam with a center wavelength λc and optically modulates the transmission light beam based on the signal-processed electrical signal. The optically modulated transmission light beam with a center wavelength λc is input to the AMZ 2*f* of the optical multiplexer 9 as the signal light beam Sc.

The monitor circuit Mon #17 is optically connected to a first output port of the output coupler Cb of the AMZ 2*e*, and the monitor circuit Mon #18 is optically connected to a first output port of the output coupler Cb of the AMZ 2*f*. The monitor circuit Mon #17 monitors the power of the output light beam output from the first output port of the output coupler Cb of the AMZ 2*e*, and the monitor circuit Mon #18 monitors the power of the output light beam output from the first output port of the output coupler Cb of the AMZ 2*f*. The monitor circuit Mon #17 notifies the control circuit Dec #11 of the power of the monitoring result. The monitor circuit Mon #18 notifies the control circuit Dec #12 of the power of the monitoring result.

The control circuit Dec #11 controls the adjustment amounts of the optical phases for the phase shifters Hu and Hd of the AMZ 2*e* in accordance with the monitoring result of the output light beam by the monitor circuit Mon #17. The control circuit Dec #12 controls the adjustment amounts of the optical phases for the phase shifters Hu and Hd of the AMZ 2*f* in accordance with the monitoring result of the output light beam by the monitor circuit Mon #18.

With the above configuration, the power of the output light beam output from a second output port of the output coupler Cb of the AMZ 2*e* to the AMZ 2*d* at the subsequent stage and the power of the output light beam output from a second output port of the output coupler Cb of the AMZ 2*f* to the AMZ 2*d* at the subsequent stage remain the same, and the power of the output light beam output from the first output port of the output coupler Cb of the AMZ 2*e* to the monitor circuit Mon #17 and the power of the output light beam output from the first output port of the output coupler Cb of the AMZ 2*f* to the monitor circuit Mon #18 decrease.

The preceding-stage multiplexing circuit 23 includes the AMZs 2*g* to 2*i*, the control circuits Dec #13 to Dec #15, and the monitor circuits Mon #19 to Mon #21. The AMZ 2*g* is optically connected to the stage following the AMZs 2*h* and 2*i*. The AMZ 2*c* is optically connected to the stage following the AMZ 2*g*. The input end of the AMZ 2*h* is connected to the optical modulator 8*b* from which the signal light beam Sb is output. The input end of the AMZ 2*i* is connected to the optical modulator 8*d* from which the signal light beam Sd is output.

The optical modulator 8*b* uses the wavelength light beam Wb with a center wavelength λb output from the LO 5*b* as a transmission light beam with a center wavelength λb and optically modulates the transmission light beam based on the signal-processed electrical signal. The optically modulated transmission light beam with a center wavelength λb is input to the AMZ 2*h* of the optical multiplexer 9 as the signal light beam Sb. The optical modulator 8*d* uses the wavelength light beam Wd with a center wavelength λd output from the LO 5*d* as a transmission light beam with a center wavelength λd and optically modulates the transmission light beam based on the signal-processed electrical signal. The optically modulated transmission light with a center wavelength λd is input to the AMZ 2*i* of the optical multiplexer 9 as the signal light beam Sd.

The monitor circuit Mon #20 is optically connected to a first output port of the output coupler Cb of the AMZ 2*h*, and the monitor circuit Mon #21 is optically connected to a first output port of the output coupler Cb of the AMZ 2*i*. The monitor circuit Mon #20 monitors the power of the output light beam output from the first output port of the output coupler Cb of the AMZ 2*h*, and the monitor circuit Mon #21 monitors the power of the output light beam output from the first output port of the output coupler Cb of the AMZ 2*i*. The monitor circuit Mon #20 notifies the control circuit Dec #14 of the power of the monitoring result. The monitor circuit Mon #21 notifies the control circuit Dec #15 of the power of the monitoring result.

The control circuit Dec #14 controls the adjustment amounts of the optical phases for the phase shifters Hu and Hd of the AMZ 2*h* in accordance with the monitoring result of the output light beam by the monitor circuit Mon #20. The control circuit Dec #15 controls the adjustment amounts of the optical phases for the phase shifters Hu and Hd of the AMZ 2*i* in accordance with the monitoring result of the output light beam by the monitor circuit Mon #21.

With the above configuration, the power of the output light beam output from a second output port of the output coupler Cb of the AMZ 2*h* to the AMZ 2*g* at the subsequent stage and the power of the output light beam output from a second output port of the output coupler Cb of the AMZ 2*i* to the AMZ 2*g* at the subsequent stage remain the same, and the power of the output light beam output from the first output port of the output coupler Cb of the AMZ 2*h* to the monitor circuit Mon #20 and the power of the output light beam output from the first output port of the output coupler Cb of the AMZ 2*i* to the monitor circuit Mon #21 decrease.

The subsequent-stage multiplexing circuit 21 includes the AMZ 2*a* to 2*c*, the control circuits Dec #7 to Dec #9, and the monitor circuits Mon #13 to Mon #15. The AMZ 2*a* is optically connected to the stage following the AMZs 2*b* and 2*c*. An output port Pout, to which the wavelength-multiplexed signal light beam Sz is output, is provided at the output end of the AMZ 2*a*.

The monitor circuit Mon #14 is optically connected to a first output port of the output coupler Cb of the AMZ 2*b*, and the monitor circuit Mon #15 is optically connected to a first output port of the output coupler Cb of the AMZ 2*c*. The monitor circuit Mon #14 monitors the power of the output light beam output from the first output port of the output coupler Cb of the AMZ 2*b*, and the monitor circuit Mon #15 monitors the power of the output light beam output from the first output port of the output coupler Cb of the AMZ 2*c*. The monitor circuit Mon #14 notifies the control circuit Dec #8 of the power of the monitoring result. The monitor circuit Mon #15 notifies the control circuit Dec #9 of the power of the monitoring result.

The control circuit Dec #8 controls the adjustment amounts of the optical phases for the phase shifters Hu and Hd of the AMZ 2*b* in accordance with the monitoring result of the output light beam by the monitor circuit Mon #14. The control circuit Dec #9 controls the adjustment amounts of the optical phases for the phase shifters Hu and Hd of the AMZ 2*c* in accordance with the monitoring result of the output light beam by the monitor circuit Mon #15.

With the above configuration, the power of the output light beam output from a second output port of the output coupler Cb of the AMZ 2*b* to the AMZ 2*a* at the subsequent stage and the power of the output light beam output from a second output port of the output coupler Cb of the AMZ 2*c* to the AMZ 2*a* at the subsequent stage remain the same, and the power of the output light beam output from the first output port of the output coupler Cb of the AMZ 2*b* to the monitor circuit Mon #14 and the power of the output light beam output from the first output port of the output coupler Cb of the AMZ 2*c* to the monitor circuit Mon #15 decrease.

As described above, the preceding-stage multiplexing circuits 22 and 23 and the subsequent-stage multiplexing circuit 21 are connected in multiple stages in a tree form so that the signal light beam Sa with a center wavelength λa to the signal light beam Sd with a center wavelength Ad are input from the AMZs 2*e*, 2*f*, 2*h*, and 2*i* to the AMZs 2*d* and 2*g*, respectively, and are input from the AMZs 2*d* and 2*g* to the different AMZs 2*b* and 2*c* at the subsequent stage, respectively. The wavelength interval of the transmission band of each of the AMZs 2*a* to 2*i* is determined according to its arm length difference. More specifically, the wavelength interval of the transmission band of each of the AMZs 2*a* to 2*i* is substantially inversely proportional to its arm length difference.

The arm length difference of each of the AMZs 2*a* to 2*c* is set so that the wavelength interval of the transmission band is equal to the wavelength spacing Δλ of the center wavelengths λa to λd. The arm length difference of each of the AMZs 2*d* to 2*f* and the AMZs 2*g* to 2*i* is set to ½ times the arm length difference of each of the AMZs 2*a* to 2*c* so that the wavelength interval of the transmission band is two times (2×Δλ) the spacing Δλ of the center wavelengths.

Thus, the preceding-stage multiplexing circuit 22 multiplexes the signal light beam Sa with a center wavelength λa and the signal light beam Sc with a center wavelength λc into the wavelength-multiplexed signal light beam Sac of center wavelengths λa and λc. The preceding-stage multiplexing circuit 23 multiplexes the signal light beam Sb with a center wavelength λb and the signal light beam Sd with a center wavelength λd into the wavelength-multiplexed signal light beam Sbd of center wavelengths λb and λd. The subsequent-stage multiplexing circuit 21 multiplexes the wavelength-multiplexed signal light beam Sac and the wavelength-multiplexed signal light beam Sbd into the wavelength-multiplexed signal light beam Sz.

As described above, in the optical transmission device TS1 according to the comparative example, the optical demultiplexer 1 includes nine phase shifters Hu and nine phase shifters Hd. In the optical transmission device TS1 according to the comparative example, the optical multiplexer 9 includes nine phase shifters Hu and nine phase shifters Hd. That is, the total number of the phase shifters Hu and Hd is 36. This leads to problems such as an increase in the size of the optical transmission device TS1 and high power consumption.

EMBODIMENT

An optical transmission device TR2 in accordance with an embodiment will be described with reference to FIG. 2. The same components as those of the respective devices of the optical transmission device TR1 illustrated in FIG. 1A and FIG. 1B are basically denoted by the same symbols or the corresponding symbols, and the description thereof will be omitted.

Figure 2:
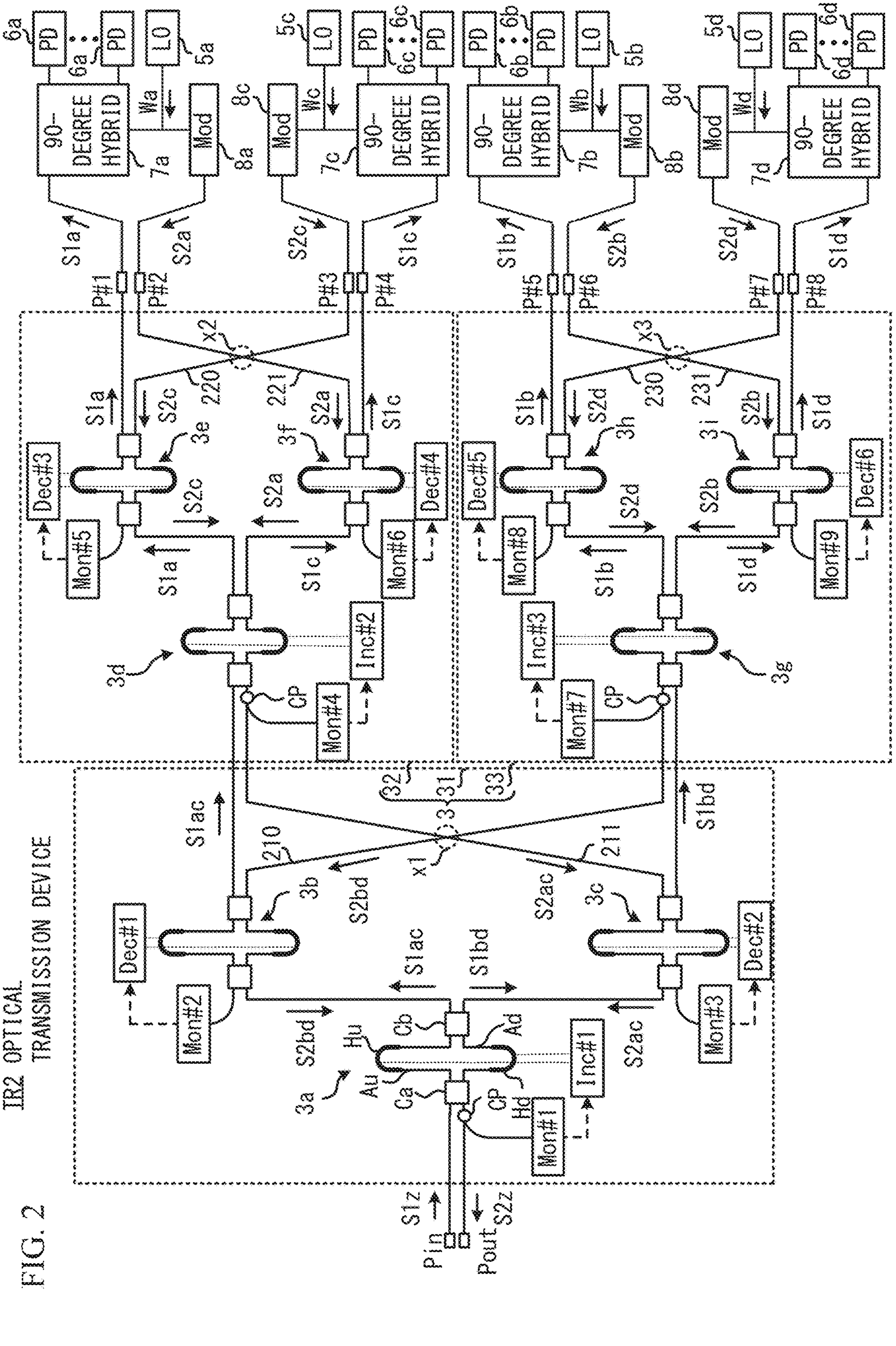
FIG. 2 illustrates an optical transmission device in accordance with an embodiment.

As illustrated in FIG. 2, the optical transmission device TR2 according to the embodiment includes an optical circuit 3, the LOs 5*a* to 5*d*, the PDs 6*a* to 6*d*, the 90-degree hybrid circuits 7*a* to 7*d*, and the optical modulators 8*a* to 8*d*. The optical transmission device TR2 includes four PDs 6*a*, but some of the four PDs 6*a* are not illustrated.

The LO 5*a* is connected to both the 90-degree hybrid circuit 7*a* and the optical modulator 8*a*. The LO 5*b* is connected to both the 90-degree hybrid circuit 7*b* and the optical modulator 8*b*. The LO 5*c* is connected to both the 90-degree hybrid circuit 7*c* and the optical modulator 8*c*. The LO 5*d* is connected to both the 90-degree hybrid circuit 7*d* and the optical modulator 8*d*. The LO 5*c* is an example of a first light source. The LO 5*a* is an example of a second light source. The LO 5*a* outputs a local oscillator light beam whose frequency is shifted by a half period from the period of an AMZ 3*e* described later, for example.

The wavelength light beams Wa to Wd output from the LOs 5*a* to 5*d* are input to the input ports of the optical modulators 8*a* to 8*d*, respectively, as transmission light beams. The input port of the optical modulator 8*c* is an example of a predetermined input port. The output port of the optical modulator 8*c* is an example of a predetermined optical port. Wavelength light beams whose frequencies are shifted by a half period from those of the wavelength light beams Wa to Wd output from the LOs 5*a* to 5*d* are input to first input ports of the two input ports of the 90-degree hybrid circuits 7*a* to 7*d*, respectively, as local oscillator light beams. The input port of the 90-degree hybrid circuit 7*a* to which the wavelength light beam Wa output from the LO 5*a* is input is an example of a second input port. The input port of the 90-degree hybrid circuit 7*a* to which a signal light beam S1*a* output from the AMZ 3*e* is input is an example of a first input port.

The optical circuit 3 includes a preceding-stage optical unit circuit group 31 and subsequent-stage optical unit circuit groups 32 and 33 that are optically connected to stages following the preceding-stage optical unit circuit group 31. The optical circuit 3 demultiplexes a wavelength-multiplexed signal light beam S1*z* of four wavelengths λa to λd into signal light beams S1*a*, S1*b*, S1*c*, and S1*d* with respective center wavelengths λa to λd of regular wavelength spacing, for example. The optical circuit 3 multiplexes signal light beams S2*a*, S2*b*, S2*c*, and S2*d* with respective center wavelengths λa to λd of regular wavelength spacing into a wavelength-multiplexed signal light beam S2*z* of wavelengths λa to λd, for example. The optical circuit 3 performs demultiplexing processing and multiplexing processing using each of the preceding-stage optical unit circuit group 31 and the subsequent-stage optical unit circuit groups 32 and 33 as a unit.

The optical circuit 3 includes AMZs 3*a* to 3*i* connected in multiple stages in a tree form (in particular, a forward tree form). That is, the optical circuit 3 may be referred to as an AMZ-type optical circuit. The preceding-stage optical unit circuit group 31 includes the AMZs 3*a* to 3*c* as three unit circuits. The subsequent-stage optical unit circuit group 32 includes the AMZs 3*d* to 3*f* as three unit circuits. The subsequent-stage optical unit circuit group 33 includes the AMZs 3*g* to 3*i* as three unit circuits. For example, the AMZ 3*a* is an example of a first optical unit circuit. The AMZ 3*b* is an example of a second optical unit circuit. The AMZ 3*c* is an example of a third optical unit circuit. The AMZs 3*a* to 3*i* each have periodic transmission characteristics, and the periods of the AMZ 3*a* to 3*i* are the same. The AMZs 3*a* to 3*i* each have a pair of arms Au and Ad with different lengths (waveguide lengths), an input coupler Ca, and an output coupler Cb. Each of the input coupler Ca and the output coupler Cb is a 2×2 coupler having two preceding-stage ports and two subsequent-stage ports. Therefore, each of the AMZ 3*a* to 3*i* may be referred to as a two-input two-output type optical unit circuit. For example, a first subsequent-stage port of the two subsequent-stage ports of the AMZ 3*a* is optically connected to a first preceding-stage port of the two preceding-stage ports of the AMZ 3*b*, and a second subsequent-stage port of the two subsequent-stage ports of the AMZ 3*a* is optically connected to a first preceding-stage port of the two preceding-stage ports of the AMZ 3*c*.

The relationship between a first preceding-stage port of the two preceding-stage ports of the input coupler Ca and a first subsequent-stage port of the two subsequent-stage ports of the output coupler Cb and the relationship between a second preceding-stage port of the two preceding-stage ports of the input coupler Ca and a second subsequent-stage port of the two subsequent-stage ports of the output coupler Cb have equivalent transmission spectra. The relationship between the first preceding-stage port of the two preceding-stage ports of the input coupler Ca and the second subsequent-stage port of the two subsequent-stage ports of the output coupler Cb and the relationship between the second preceding-stage port of the two preceding-stage ports of the input coupler Ca and the first subsequent-stage port of the two subsequent-stage ports of the output coupler Cb also have equivalent transmission spectra. On the other hand, the relationship between the first preceding-stage port of the two preceding-stage ports of the input coupler Ca and the first subsequent-stage port of the two subsequent-stage ports of the output coupler Cb and the relationship between the first preceding-stage port of the two preceding-stage ports of the input coupler Ca and the second subsequent-stage port of the two subsequent-stage ports of the output coupler Cb have transmission spectra in a complementary or reciprocal (hereinafter, simply referred to as complementary) relationship such as t:1−t (t is a real number or a natural number). The relationship between the second preceding-stage port of the two preceding-stage ports of the input coupler Ca and the first subsequent-stage port of the two subsequent-stage ports of the output coupler Cb and the relationship between the second preceding-stage port of the two preceding-stage ports of the input coupler Ca and the second subsequent-stage port of the two subsequent-stage ports of the output coupler Cb also have transmission spectra in a complementary relationship such as t:1−t. For example, the center wavelength λa and the center wavelength λc have a complementary relationship, and the center wavelength λb and the center wavelength λd have a complementary relationship. Thus, the complementary relationship corresponds to a relationship in which the center wavelength is inverted by a half period.

The wavelength-multiplexed signal light beam S1*z* input to the input coupler Ca is input to the pair of arms Au and Ad. The phase shifters Hu and Hd adjust the optical phases in the pair of arms Au and Ad of the AMZs 3*a* to 3*i*, respectively. This compensates for optical phase shift due to manufacturing variations and reduces crosstalk between input and output. The first optical unit circuit can be implemented by the AMZ 3*a* and the phase shifters Hu and Hd of the AMZ 3*a*. The second optical unit circuit can be implemented by the AMZ 3*b* and the phase shifters Hu and Hd of the AMZ 3*b*. The third optical unit circuit can be implemented by the AMZ 3*c* and the phase shifters Hu and Hd of the AMZ 3*c*. Also for the AMZ 3*d* to 3*i*, the first optical unit circuit, the second optical unit circuit, and the third optical unit circuit can be implemented by the same relationship as the AMZ 3*a* to 3*c*, respectively. The first optical unit circuit, the second optical unit circuit, and the third optical unit circuit all have periodic transmission characteristics.

The optical circuit 3 includes the monitor circuits Mon #1 to Mon #9 that monitor the power of the output light beams of the AMZs 3*a* to 3*i*, the control circuits Dec #1 to Dec #6 that decrease the power according to the monitoring results of the power of the output light beams, and the control circuits Inc #1 to Inc #3 that increase the power according to the monitoring results of the power of the output light beams, in order to control the phase shifters Hu and Hd of the AMZs 3*a* to 3*i*. The control circuits Dec #1 to Dec #6 are examples of a first control circuit, and the control circuits Inc #1 to Inc #3 are examples of a second control circuit.

The monitor circuits Mon #1 to Mon #9 monitor the power of the output light beams of the AMZ 3*a* to 3*i*, respectively. The control circuits Dec #1 to Dec #6 and Inc #1 to Inc #3 control the adjustment amounts of the optical phases in the pair of arms Au and Ad with respect to the phase shifters Hu and Hd according to the power of the output light beams, thereby compensate for the optical phase shift. For example, the control circuits Dec #1 to Dec #6 control the heater power supplied to the phase shifters Hu and Hd so as to lower the temperatures of the phase shifters Hu and Hd. The control circuits Inc #1 to Inc #3 control the heater power supplied to the phase shifters Hu and Hd so as to increase the temperatures of the phase shifters Hu and Hd.

The preceding-stage optical unit circuit group 31 includes the AMZs 3*a* to 3*c*, the control circuits Inc #1, Dec #1, and Dec #2, and the monitor circuits Mon #1 to Mon #3. The AMZs 3*b* and 3*c* are optically connected to stages following the AMZ 3*a*, respectively. The AMZs 3*d* and 3*g* are optically connected to stages following the AMZ 3*b*, respectively. The AMZs 3*d* and 3*g* are optically connected to stages following the AMZ 3*c*, respectively. The input port Pin from which the wavelength-multiplexed signal light beam S1*z* is input is provided at the input end of the AMZ 3*a*. The output port Pout to which the wavelength-multiplexed signal light beam S2*z* is output is provided at the output end of the AMZ 3*a*.

The AMZs 3*e* and 3*f* are optically connected to stages following the AMZ 3*d*, respectively. The 90-degree hybrid circuit 7*a* is optically connected to the stage following the AMZ 3*e* through an output port P #1, and the optical modulator 8*a* is optically connected to the stage following the AMZ 3*f* through an output port P #2. The optical modulator 8*c* is optically connected to the stage following the AMZ 3*e* through an output port P #3, and the 90-degree hybrid circuit 7*c* is optically connected to the stage following the AMZ 3*f* through an output port P #4.

The AMZs 3*h* and 3*i* are optically connected to the stage following the AMZ 3*g*. The 90-degree hybrid circuit 7*b* is optically connected to the stage following the AMZ 3*h* through an output port P #5, and the optical modulator 8*b* is optically connected to the stage following the AMZ 3*i* through an output port P #6. The optical modulator 8*d* is optically connected to the stage following the AMZ 3*h* through an output port P #7, and the 90-degree hybrid circuit 7*d* is optically connected to the stage following the AMZ 3*i* through an output port P #8.

The wavelength interval of the transmission band of each of the AMZs 3*a* to 3*i* is determined according to its arm length difference. More specifically, the wavelength interval of the transmission band of each of the AMZ 3*a* to 3*i* is substantially inversely proportional to its arm length difference.

The arm length difference of each of the AMZs 3*a* to 3*c* of the preceding-stage optical unit circuit group 31 is set so that the wavelength interval of the transmission band is equal to the spacing Δλ of the center wavelengths λa to λd. Therefore, the preceding-stage optical unit circuit group 31 transmits and demultiplexes the wavelength-multiplexed signal light beam S1*z* in the transmission band of the interval Δλ. The preceding-stage optical unit circuit group 31 transmits and multiplexes wavelength-multiplexed signal light beams S2*bd* and S2*ac* in the transmission band of the interval Δλ.

The arm length differences of the AMZs 3*d* to 3*i* are set so that the wavelength intervals of the transmission bands are two times (2×Δλ) the spacing Δλ of the center wavelengths. Therefore, the subsequent-stage optical unit circuit group 32 transmits and demultiplexes a wavelength-multiplexed signal light beam S1*ac* in the transmission band of the interval Δλ. The subsequent-stage optical unit circuit group 32 transmits and multiplexes the signal light beams S2*a* and S2*c* in the transmission band of the interval Δλ. The subsequent-stage optical unit circuit group 33 transmits and demultiplexes a wavelength-multiplexed signal light beam S1*bd* in the transmission band of the interval Δλ. The subsequent-stage optical unit circuit group 33 transmits and multiplexes the signal light beams S2*b* and S2*d* in the transmission band of the interval Δλ.

A waveguide 210 extending from a first subsequent-stage port of the two subsequent-stage ports provided in the output coupler Cb of the AMZ 3*b* and a waveguide 211 extending from a first subsequent-stage port of the two subsequent-stage ports provided in the output coupler Cb of the AMZ 3*c* intersect at a crossover point x1 and are connected to a first preceding-stage port of the two preceding-stage ports provided in the input coupler Ca of the AMZ 3*g* at the subsequent stage and a first preceding-stage port of the two preceding-stage ports provided in the input coupler Ca of the AMZ 3*d* at the subsequent stage, respectively. A waveguide 220 extending from a first subsequent-stage port of the two subsequent-stage ports provided in the output coupler Cb of the AMZ 3*e* and a waveguide 221 extending from a first subsequent-stage port of the two subsequent-stage ports provided in the output coupler Cb of the AMZ 3*f* intersect at a crossover point x2 and are connected to the optical modulators 8*c* and 8*a* at the subsequent-stage through the output ports P #3 and P #2, respectively. A waveguide 230 extending from a first subsequent-stage port of the two subsequent-stage ports provided in the output coupler Cb of the AMZ 3*h* and a waveguide 231 extending from a first subsequent-stage port of the two subsequent-stage ports provided in the output coupler Cb of the AMZ 3*i* intersect at a crossover point x3 and are connected to the optical modulators 8*d* and 8*b* at the subsequent stages through the output ports P #7 and P #6, respectively.

As described above, in the subsequent-stage optical unit circuit group 32, the waveguides are configured to intersect at the crossover point x2. Therefore, the signal light beam S2*c* with a center wavelength λc output from the optical modulator 8*c* is input to the AMZ 3*e*, and the signal light beam S2*a* with a center wavelength λa output from the optical modulator 8*a* is input to the AMZ 3*f*. In the subsequent-stage optical unit circuit group 33, the waveguides are configured to intersect at the crossover point x3. Therefore, the signal light beam S2*d* with a center wavelength λd output from the optical modulator 8*d* is input to the AMZ 3*h*, and the signal light beam S2*b* with a center wavelength λb output from the optical modulator 8*b* is input to the AMZ 3*i*. Further, in the preceding-stage optical unit circuit group 31, the waveguides are configured to intersect at the crossover point x1. Therefore, the wavelength-multiplexed signal light beam S2*bd* of center wavelengths λb and λd output from the AMZ 3*g* is input to the AMZ 3*b*, and the wavelength-multiplexed signal light beam S2*ac* of center wavelengths λa and λc output from the AMZ 3*d* is input to the AMZ 3*c*.

In the optical transmission device TR2, the total number of the phase shifters Hu and Hd is 18, compared to the optical transmission device TR1 using 36 phase shifters Hu and Hd. Thus, the optical transmission device TR2 can be smaller in size than the optical transmission device TR1. Further, since the total number of the phase shifters Hu and Hd is smaller than that of the optical transmission device TR1, the power required for controlling the phase shifters Hu and Hd can be reduced, and the power consumption is reduced.

In the optical transmission device TR2, for example, the signal light beam S1*a* output from the AMZ 3*d* is guided to the AMZ 3*e*, while the signal light beam S2*c* output from the AMZ 3*e* is guided to the AMZ 3*d*. Due to the crossover point x2, the signal light beams S2*c* and S1*a* with different wavelengths are transmitted in the waveguide connecting the AMZ 3*d* and the AMZ 3*e*, so interference between signal light beams in the waveguide is avoided.

For example, the signal light beam S2*c* based on the local oscillator light beam having the specified center wavelength λc is input to the AMZ 3*e*, the monitor circuit Mon #5 monitors the power of the signal light beam S2*c*, and the control circuit Dec #3 controls each of the phase shifters Hu and Hd of the AMZ 3*e*. Thus, each of the phase shifters Hu and Hd of the AMZ 3*e* is controlled based on the power of the signal light beam S2*c* with a center wavelength λc, and thereby the signal light beam S1*a* in which crosstalk is reduced is output from the output coupler Cb of the AMZ 3*e*. That is, the relationship between the output port P #1 and the center wavelength Aa of the signal light beam S1*a* can be uniquely specified. As described above, the AMZ 3*e* has been described as an example, but the same applies to the AMZ 3*a* to 3*d* and 3*f* to 3*i*.

When the number of wavelengths of the optical transmission device TR2 is the same as that of the optical transmission device TR1, the device scale can be reduced, and for example, it is possible to contribute to power saving of a telecommunication company. On the other hand, if the power of the telecommunication company is the same as before, there is an advantage that the number of wavelengths can be increased without changing the device scale.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

For example, in the embodiment, the four LOs 5*a*, 5*b*, 5*c*, and 5*d* are used as single-wavelength light sources, but the number of single-wavelength light sources is not particularly limited, and may be, for example, eight or sixteen.

What is claimed is:

1. An optical transmission device comprising:

an optical circuit in which optical unit circuit groups are connected in multiple stages in a tree form, each of the optical unit circuit groups including three optical unit circuits of a two-input two-output type each having periodic transmission characteristics, the three optical unit circuits being connected in multiple stages in a tree form so that a first subsequent-stage port of two subsequent-stage ports of a first optical unit circuit, which is arranged at a preceding-stage as one of the three optical unit circuits, is connected to a first preceding-stage port of two preceding-stage ports of a second optical unit circuit, which is arranged at a subsequent-stage as one of the remaining two of the three optical unit circuits, and a second subsequent-stage port of the two subsequent-stage ports of the first optical unit circuit is connected to a first preceding-stage port of two preceding-stage ports of a third optical unit circuit, which is arranged at a subsequent-stage as the other of the remaining two of the three optical unit circuit;

a first light source that outputs a first local oscillator light beam;

a second light source that outputs a second local oscillator light beam having a frequency that is half a period away from a period of the second optical unit circuit;

an optical modulator including:

a predetermined output port that is connected to a first subsequent-stage port of two subsequent-stage ports provided in the second optical unit circuit at a last stage included in a first optical unit circuit group, which is arranged at a last stage of the optical circuit among the three optical unit circuit groups, and a predetermined input port that is connected to the first light source;

a 90-degree hybrid circuit including:

a first input port connected to a second subsequent-stage port of the two subsequent-stage ports provided in the second optical unit circuit at the last stage, and a second input port connected to the second light source, wherein the optical circuit demultiplexes a first wavelength-multiplexed signal light beam input to a first preceding-stage port of two preceding-stage ports provided in the first optical unit circuit included in a second optical unit circuit group, which is arranged at a first stage of the optical circuit among the three optical unit circuit groups, into first signal light beams with respective first wavelengths different from each other and outputs the first signal light beams from the second subsequent-stage port of the two subsequent-stage ports provided in the second optical unit circuit at the last stage, and multiplexes second signal light beams with respective second wavelengths, which are not adjacent to the first wavelengths, input to the first subsequent-stage port of the two subsequent-stage ports provided in the second optical unit circuit at the last stage, and outputs a second wavelength-multiplexed signal light beam from a second preceding-stage port of the two preceding-stage ports provided in the first optical unit circuit at the first stage.

2. The optical transmission device according to claim 1, wherein each of the three optical unit circuits includes:

an asymmetric Mach-Zehnder interferometer having a pair of arms with different lengths, and a phase shifter that adjusts an optical phase in the asymmetric Mach-Zehnder interferometer.

3. The optical transmission device according to claim 2, further comprising:

a monitor circuit that is provided at a position where the second signal light beams are received and monitors power of the second signal light beams; and a first control circuit configured to control the phase shifter to decrease the power in accordance with a monitoring result of the power by the monitor circuit, wherein the first control circuit is provided in the second optical unit circuit.

4. The optical transmission device according to claim 2, further comprising:

a monitor circuit that is provided at a position where the second signal light beams are received and monitors power of the second signal light beams; and a second control circuit configured to control the phase shifter to increase the power in accordance with a monitoring result of the power by the monitor circuit, wherein the second control circuit is provided in the first optical unit circuit.

5. The optical transmission device according to claim 1, wherein the first optical unit circuit, the second optical unit circuit, and the third optical unit circuit have the same period.

* * * * *